UNITED STATES PATENT OFFICE.

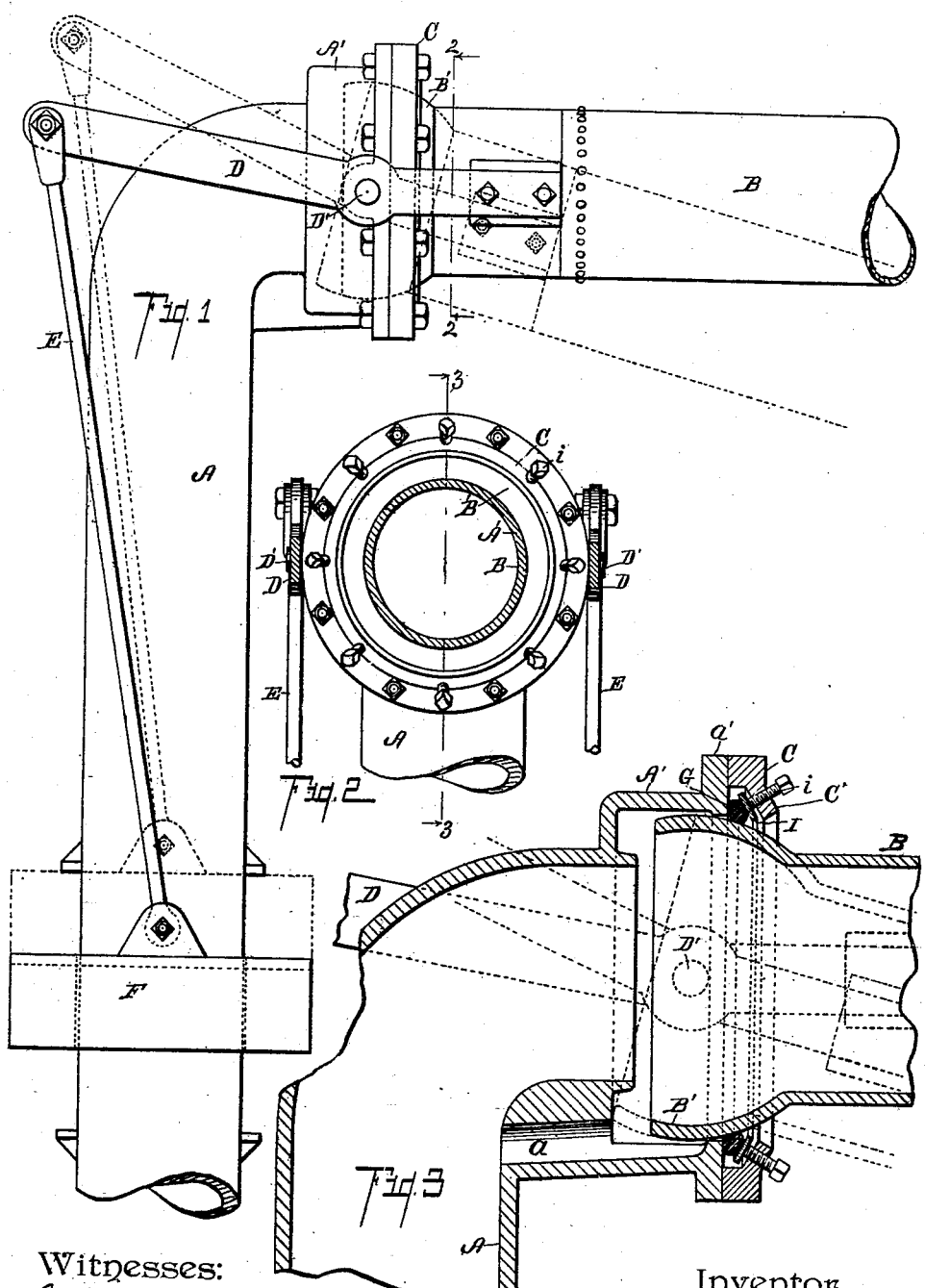

JAMES HENDERSON, OF THREE RIVERS, MICHIGAN, ASSIGNOR TO THE SHEFFIELD CAR CO., OF THREE RIVERS, MICHIGAN.

FLEXIBLE PIPE-COUPLING.

No. 904,534.  Specification of Letters Patent.  Patented Nov. 24, 1908.

Application filed October 12, 1903. Serial No. 176,694.

*To all whom it may concern:*

Be it known that I, JAMES HENDERSON, a citizen of the United States, residing at the village of Three Rivers, in the county of St. Joseph and State of Michigan, have invented certain new and useful Improvements in Flexible Pipe-Couplings, of which the following is a specification.

This invention relates to improvements in flexible pipe couplings.

It relates particularly to pipe couplings for locomotive stand pipes, although it is desirable for use in other relations.

The objects of this invention are, first, to provide an improved flexible pipe coupling in which the friction upon the parts is reduced to a minimum. Second, to provide an improved flexible pipe coupling which may be adjusted to secure proper fitting joints and to compensate for wear. Third, to provide an improved flexible joint coupling for locomotive stand pipes and the like, which is automatically drained. Fourth, to provide an improved flexible joint coupling for locomotive stand pipes and the like, which is economical to produce, durable in use, and easy to operate.

Futher objects, and objects relating to structural details, will definitely appear in the following specification.

The invention is clearly defined and pointed out in the claims.

A structure embodying the features of my invention is fully illustrated in the accompanying drawing, forming a part of this specification, in which, Figure 1 is a detail side elevation view of a structure embodying the features of my invention. Fig. 2 is a detail, cross-sectional view taken on line 2—2 of Fig. 1. Fig. 3 is an enlarged detail sectional view taken on line 3—3 of Fig. 2.

In the drawing, the sectional views are taken looking in the direction of the little arrows at the ends of the section lines, and similar letters of reference refer to similar parts throughout the several views.

Referring to the drawing, A represents the vertical portion or section of a locomotive stand pipe, and B, the nozzle or delivery portion or section. The section A is provided with a head or socket member A' at its upper end. The socket member A' terminates in an annular flange, a'. The section B terminates in a ball member B' adapted to be inserted into the socket member A'. Secured to the flange a' of the socket member A', is a ring C having an inwardly and forwardly projecting flange C'. The section B is pivotally supported on the head or socket member by arms D, which are arranged on the pivots D'. Thus arranged, the section B may be swung up and down, as indicated in dotted lines in Figs. 1 and 3. A counterbalance F is secured to the projecting end of one of the arms D by the link E. A packing ring or gasket G is provided to form a tight joint between the socket A' and the ball B', see Fig. 3. The gasket G is retained in position by a ring-like follower I, which is held adjustably against the gasket by set screws i, arranged through the flange C' of the ring C. Thus arranged, the tension upon the gasket may be adjusted sufficiently to make a tight joint and also may be adjusted to compensate for wear.

With the parts thus arranged, there is very little wear upon the apparatus, as the gasket has no weight to carry, simply operating against the ball surface which is a nicely polished surface. The structure is very easy to operate, as the section B is carried wholly upon the pivots D'. With the counterbalance F, the force required to adjust the delivery portion B is comparatively slight.

A drain passage a is provided for the socket (see Fig. 3) so that there is no danger of the structure being damaged by freezing or thereby becoming inoperative. When the delivery pipe is in its downward position, this drain pipe is practically cut off by the end of the ball member B', so that the delivery of the water is not retarded thereby.

My improved coupling is very economical to produce and durable in use, and while the same is particularly adapted for use in connection with stand pipes, in which relation I have illustrated and described the same, it is very desirable for use in other relations, particularly on heavy pipes or on pipes of large capacity.

I have illustrated and described my improved coupling in the form preferred by me on account of its simplicity in construction and durability in use. I am aware, however, that it is capable of considerable variation without departing from my invention.

Having thus described my invention, what I claim as new and desire to secure by Letters Patent, is:—

1. The combination of a vertical pipe section having an elbow at its upper end terminating in a socket member, having a cylindrical bore provided with an outwardly projecting flange at the outer end thereof; laterally projecting journals on said socket member; an adjustable horizontally-arranged pipe section provided with a ball member at its inner end projecting into said socket member; supporting arms by which said horizontally-arranged pipe section is carried and said ball member supported in said socket member mounted on said journals; a ring having an inwardly projecting flange secured to the flange of said socket member; a gasket or packing ring of less diameter than the ball member arranged to bear against the end of said socket member and the surface of said ball member; a ring-like follower or retainer for said gasket; and set screws arranged through said flange on said ring for adjusting said gasket retainer, for the purpose specified.

2. The combination of a vertical pipe section having an elbow at its upper end terminating in a socket member, having a cylindrical bore; laterally projecting journals on said socket member; an adjustable horizontally-arranged pipe section provided with a ball member at its inner end projecting into said socket member; supporting arms by which said horizontally-arranged pipe section is carried and said ball member supported in said socket member, mounted on said journals; and a gasket or packing ring arranged to bear against the end of said socket member and the surface of said ball member, for the purpose specified.

3. The combination of a vertical pipe section having an elbow at its upper end terminating in a socket member, having a cylindrical bore; laterally projecting journals on said socket member; an adjustable horizontally-arranged pipe section provided with a ball member at its inner end projecting into said socket member; and supporting arms by which said horizontally-arranged pipe section is carried and said ball member supported in said socket member, for the purpose specified.

4. The combination of a vertical pipe section having an elbow at its upper end terminating in a socket member; an adjustable horizontally-arranged pipe section having a ball member at its inner end arranged within said socket member; journals projecting from said socket member; a pair of arms by which said horizontal member is carried and said ball member is supported within said socket member, mounted on said journals; and a counterbalance for said adjustable pipe section connected to said supporting arms.

5. The combination of a vertical pipe section having an elbow at its upper end terminating in a socket member; an adjustable horizontally-arranged pipe section having a ball member at its inner end arranged within said socket member; journals projecting from said socket member; and a pair of arms by which said horizontal member is carried and said ball member is supported within said socket member, mounted on said journals.

6. The combination of a vertical pipe section having an elbow at its upper end terminating in a cylindrical socket member; a drain passage at the bottom of said socket member opening into said vertical pipe section; journals on said socket member; a ball member; and arms by which said ball member is carried and supported in said socket member mounted on said journals, for the purpose specified.

7. A stand pipe having in combination a vertical portion, a horizontal arm having a ball-and-socket connection with the vertical portion, trunnions secured to the vertical portion, levers pivotally mounted on the trunnions, and having one end secured to the horizontal arm and thereby holding the horizontal arm in operative relation to the vertical portion.

8. The combination of a socket member, a ball member, journals on said socket member, and arms mounted on said journals and supporting said ball member for angular adjustment in said socket member.

In witness whereof, I have hereunto set my hand and seal in the presence of two witnesses.

JAMES HENDERSON. [L. S.]

Witnesses:
 W. S. HOVEY,
 JOHN V. HAGAN.